Patented June 17, 1952

2,600,380

UNITED STATES PATENT OFFICE 2,600,380

POLYMETHINE DYESTUFFS

Harry Derek Edwards, Ilford, England, assignor to Ilford Limited, Ilford, England, a British company No Drawing. Application September 22, 1949, Serial No. 117,267. In Great Britain October 2, 1948

20 Claims. (Cl. 260—287)

This invention relates to methine dyestuffs and particularly to dyestuffs having a substituted methine chain.

In co-pending application No. 117,265, filed September 22, 1949, now Patent No. 2,534,112, there is described the production of intermediates of the general formula:

$$\begin{array}{c} CN \quad R_2 \\ C=C \\ COOR_1 \quad SR_3 \end{array}$$

where $R_1$ and $R_2$ are alkyl groups and $R_3$ is an alkyl or aralkyl group. As explained in that application, $R_1$ and $R_2$ may be alkyl groups containing 1 to 12 carbon atoms such as methyl, ethyl, hexyl, octyl and dodecyl groups, and $R_3$ may be any of such alkyl groups or an aralkyl group, e. g. benzyl or naphthylmethyl.

The preferred intermediates according to the said application have the formula:

$$\begin{array}{c} CN \quad CH_3 \\ C=C \\ \quad SR_3 \\ COOC_2H_5 \end{array}$$

or $$\begin{array}{c} CN \quad CH_3 \\ C=C \\ \quad SR_3 \\ COOCH_3 \end{array}$$

As explained in the said application, the compounds of the said formula may exist in the alternative stereoisomeric form represented by the formula:

$$\begin{array}{c} CN \quad SR_3 \\ C=C \\ COOR_1 \quad R_2 \end{array}$$

Accordingly the formula $$\begin{array}{c} CN \quad R_2 \\ C=C \\ COOR_1 \quad SR_3 \end{array}$$

used herein and in the following claims is to be understood to include the stereoisomeric form represented by the said alternative formula.

Where in such intermediates the group $R_2$ is an alkyl or aralkyl group the formula may be re-written:

$$\begin{array}{c} CN \quad CH_2R_4 \\ C=C \\ COOR_1 \quad SR_3 \end{array}$$

where $R_4$ is a hydrogen atom or an alkyl group.

The $CH_2$ group in such compounds has been found to be reactive and according to the present invention dyestuffs are obtained by reacting a compound of the general formula:

$$\begin{array}{c} CN \quad CH_2R_4 \\ C=C \\ COOR_1 \quad SR_3 \end{array}$$

where $R_1$, $R_3$ and $R_4$ have the meanings assigned to them above, with an alkyl or aralkyl quaternary salt of a five-membered or six-membered heterocyclic nitrogen compound of the general formula:

$$\begin{array}{c} \overset{\ulcorner---D---\urcorner}{N=(CH-CH)_n=C-CH=CH-Q} \\ R_5 \quad X \end{array}$$

where Q represents a thioether group of the formula $SR_6$ or an amino or substituted amino (preferably acetamino) group, $R_5$ represents an alkyl or aralkyl group, $R_6$ represents an alkyl group, e. g. any of those mentioned above, X represents an acid radicle, e. g. chloride, bromide, iodide, sulphate or p-toluene sulphonate, $n$ is nought or one, and D is the residue of a five-membered or six-membered heterocyclic nitrogen nucleus.

The course of the reaction is believed to be as follows:

$$\underset{(a)}{\overset{\ulcorner---D---\urcorner}{N=(CH-CH)_n=C-CH=CH-Q}} + \underset{(b)}{\overset{CN}{\underset{R_4\ SR_3\ COOR_1}{H_2C-C=C}}}$$

$$\downarrow$$

$$\underset{(c)}{\overset{\ulcorner---D---\urcorner}{\underset{R_5}{N-(CH=CH)_n-C=CH-CH=C-C=C}}\underset{R_4\ SR_3\ COOR_1}{\overset{CN}{}}}$$

The residue D may be, for example, the residue of any of the types of heterocyclic nuclei commonly employed in photographic cyanine sensitising dyes, e. g. thiazoles, oxazoles, selenazoles and their polycyclic homologues such as those of the benzene, naphthalene, acenaphthene and anthracene series; pyridine and its polycyclic homologues such as quinoline and $\alpha$- and $\beta$- naphthoquinolines; lepidines; indolenines; diazines such as pyrimidines and quinazolines, diazoles such as thio-$\beta\beta'$-diazole, oxazolines, thiazolines and selenazolines. The polycyclic compounds of these series may be substituted in the carbocyclic rings by one or more groups such as alkyl, aryl, amino, hydroxy, alkoxy and methylene-dioxy groups or by halogen atoms.

The reaction is preferably effected in the presence of a basic condensing agent, e. g. an organic base such as pyridine or triethylamine. In the case where Q is a thioether group it is convenient to form the heterocyclic compound containing the radicle Q as a step continuous with the production of dyestuffs in accordance with the invention, i. e. to work without actual isolation of the heterocyclic thioether compound. Thus the quaternary salt of the heterocyclic compound containing a reactive methyl group in α or γ position to the quaternary nitrogen atom may be reacted with a trialkyl trithio orthoformate in the presence of acetic anhydride and the product, without purification, reacted directly with the compound of formula (b).

The dyestuffs produced according to this invention having the general formula (c) above are valuable sensitisers for silver halide photographic emulsions.

The following examples will serve to illustrate the invention, but are not to be regarded as limiting it in any way:

EXAMPLE 1

Ethyl 6-(3-ethyl-2:3-dihydrobenzthiazolylidene-2-)3-ethylthio-2-cyano-2:4-hexadienoate 2-ω-acetanilidovinyl benzthiazole ethiodide (4.5 gms.; .01 mol.) and ethyl 2-cyano-3-ethylthio-2-butenoate (1.99 gms.; .01 mol.) were boiled together for 10 minutes in 20 cc. pyridine. On standing, a black solid separated, M. Pt. 205° C.

The solid was purified by extraction with ether, the ether extract giving a deep red solution from which mauve crystals separated on concentration, M. Pt. 127° C.

Recrystallisation from methyl alcohol raised the M. Pt. to 149° C. and further crystallisation from methyl alcohol gave mauve needles, M. Pt. 151° C.

This dyestuff, incorporated in a gelatino silver iodobromide emulsion, imparts a band of sensitivity extending to 700 m$\mu$ with a sharp maximum at 680 m$\mu$.

EXAMPLE 2

Ethyl 6-(3-methyl-tetrahydrothiazolylidene-2-)-3-ethylthio-2-cyano-2:4-hexadienoate Methyl thiazoline (2.0 gms.; .02 mol.) was fused with methyl para toluene sulphonate (3.7 gms.; .02 mol.) at 100° C. for ½ hour. Ethyl trithio ortho formate (4 cc.; .021 mol.) was then added and the mixture boiled gently in acetic anhydride (15 cc.) for 10 minutes giving a deep orange solution. The acetic anhydride was distiled off in vacuo and the remaining oil dissolved in ethyl alcohol (50 cc.).

Ethyl 2 cyano 3 ethylthio 2 butenoate (4 gms.; .02 mol.) and triethylamine (3 cc.; .02 mol.) were then added and the whole boiled gently under reflux for 15 minutes giving an orange pink solution.

Dilution with water precipitated an oil which hardened to give mauve crystals M. Pt. 166° C. Crystallisation from methyl alcohol gave M. Pt. 158° C.

This dyestuff, incorporated in a gelatino silver iodobromide emulsion, imparts a band of sensitivity extending to 590 m$\mu$ with a maximum at 560 m$\mu$.

EXAMPLE 3

Ethyl 6-(3-methyl-2:3-dihydrobenzoxazolylidene-2-)3-ethylthio-2-cyano-2:4-hexadienoate 1-ω-acetanilido vinyl benzoxazole methiodide (2.1 gms.; .005 mol.) was boiled gently under reflux for 10 minutes in ethyl alcohol (30 cc.) with triethylamine (.76 cc.; .005 mol.) and ethyl 2 cyano 3 ethylthio 2 butenoate (1 gm.; .005 mol.) giving a reddish pink solution. Dilution with water precipitated an oil which hardened on standing to give mauve crystals M. Pt. 205° C. Crystallisation from methyl alcohol gave M. Pt. 210° C. Recrystallisation from methyl alcohol gave M. Pt. 212° C.

This dyestuff, incorporated in a gelatino silver iodobromide emulsion, imparts a band of sensitivity extending to 710 m$\mu$. with a maximum at 650 mu.

EXAMPLE 4

Ethyl 6-(3-methyl-2:3-dihydrobenzoxazolylidene-2)3-ethylthio-2-cyano-2:4-hexadienoate (alternative preparation)

Methyl benzoxazole (7.98 gms.; .06 mol.) was fused with methyl para toluene sulphonate (11.2 gms.; .06 mol.) at 100° C. for 4 hours.

Ethyl trithio ortho formate (12 cc.; .072 mol.) was added and the mixture was boiled gently in acetic anhydride (75 cc.) for 10 minutes giving a deep orange/red solution. The acetic anhydride was then run off and the remaining oil taken up in spirit (100 cc.).

Ethyl 2 cyano 3 ethylthio 2 butenoate (12 gms.; .06 mol.) and triethylamine (9 cc.; .06 mol.) were then added and the mixture refluxed for 15 minutes giving a deep red/pink solution. Dilution with water precipitated an oil which was washed with petroleum ether and extracted with benzene. The benzene solution was dried over potassium carbonate and the benzene was then run off under reduced pressure. The remaining oil was taken up in spirit from which mauve crystals, M. Pt. 207° C. separated on standing. Crystallisation from methyl alcohol gave M. Pt. 211° C. Second crystallisation from methyl alcohol gave M. Pt. 212° C.

EXAMPLE 5

Ethyl 6-(3-methyl-2:3-dihydrobenzthiazolylidene-2-)3-ethylthio-2-cyano-2:4-hexadienoate Methyl benzthiazole (1.49 gms.; .01 mol.) was fused for 2½ hours with methyl para toluene sulphonate (1.86 gms.; .01 mol.). Ethyl trithio ortho formate (2 cc.; .012 mol.) was then added and the mixture was boiled gently for 10 minutes in acetic anhydride (30 cc.) giving a deep orange/red solution. The acetic anhydride was distilled off under reduced pressure and the remaining oil was dissolved in ethyl alcohol (30 cc.).

Ethyl 2 cyano 3 ethyl 2 butenoate (2.0 gms.; .01 mol.) and triethylamine (1.5 cc.; .01 mol.) were then added and the mixture boiled gently for 10 minutes under reflux giving a deep mauve/red solution.

Dilution with water precipitated an oil which was washed with light petroleum and extracted with benzene. The benzene solution was dried over potassium carbonate, filtered and concentrated under reduced pressure. The remaining oil was dissolved in ethyl alcohol (20 cc.) from which mauve crystals, M. Pt. 160° C. separated on standing. Crystallisation from methyl alcohol gave M. Pt. 162° C.

EXAMPLE 6

Ethyl 6-(3-ethyl-tetrahydrothiazolylidene-2-)3-ethylthio-2-cyano-2:4-hexadienoate Methyl thiazoline (2.0 gms.; .02 mol.) was fused with ethyl para toluene sulphonate (2.0 gms.;

.02 mol.) for 3½ hours at 120° C. Ethyl trithio ortho formate (4 cc.; .024 mol.) was then added and the mixture boiled gently under reflux in acetic anhydride (15 cc.) for 10 minutes giving a deep orange red solution.

The acetic anhydride was distilled off under reduced pressure and the remaining oil was dissolved in ethyl alcohol (20 cc.). Ethyl 2 cyano 3 ethylthio 2 butenoate (4 gms.; .02 mol.) and triethylamine (3 cc.; .02 mol.) were then added and the mixture boiled gently for 10 minutes under reflux giving a deep orange/red solution. Dilution with water precipitated an oil which was washed with petroleum ether and extracted with benzene. The benzene solution was dried over potassium carbonate, filtered and concentrated under reduced pressure. The remaining oil was triturated with methyl alcohol from which mauve crystals, M. Pt. 117° C. separated on standing. Crystallisation from methyl alcohol gave mauve crystals, M. Pt. 119° C. Recrystallization from methyl alcohol gave M. Pt. 120° C.

EXAMPLE 7

*Ethyl 6-(3-ethyl-2:3-dihydro-4:5-benz-benzthiazolylidene-2-)-3-ethylthio-2-cyano-2:4-hexadienoate*

2-methyl-β-naphthathiazole (1.005 gms.; .005 mol.) was fused with ethyl para toluene sulphonate (1 gm.; .005 mol.) for 12 hours at 160° C.

Ethyl trithio ortho formate (1 cc.; .0052 mol.) was added and the mixture boiled gently under reflux in acetic anhydride (20 cc.) for 20 minutes. The acetic anhydride was then removed by distillation in vacuo. The residual oil was washed with dry ether and dissolved in ethyl alcohol (25 cc.) with ethyl 2-cyano-3-ethylthio-2-butenoate (1 gm.; .005 mol.). Triethylamine (.75 cc.; .005 mol.) was added and the mixture was boiled gently under reflux for 8 minutes giving a deep mauve/blue solution. The solution was then slightly diluted and on standing dark blue crystals separated. M. Pt. 171° C.

The crystals were extracted with benzene in a Soxhlett extractor and the benzene solution concentrated under reduced pressure to about 15 cc. Dilution of the benzene solution with light petroleum precipitated the product as dark blue crystals. M. Pt. 173° C. Crystallisation from methyl alcohol gave M. Pt. 174° C.

This dyestuff, incorporated in a gelatino silver iodobromide emulsion, imparts a band of sensitivity extending to 730 mµ with a maximum at 690 mµ.

EXAMPLE 8

*Ethyl 6-(3-methyl-2:3-dihydro-5-phenyl benzoxazolylidene-2-)-3-ethylthio-2-cyano-2:4-hexadienoate*

2-methyl-5-phenyl benzoxazole (2.09 gms.; .01 mol.) was fused with methyl para toluene sulphonate (1.86 gms.; .01 mol.) for 5 hours at 130° C.

Triethyl trithio ortho formate (2 cc.; .012 mol.) was added and the mixture boiled gently under reflux in acetic anhydride (20 cc.) for 20 minutes. The acetic anhydride was removed by distillation in vacuo. The residual oil was washed with dry ether and dissolved in ethyl alcohol (20 cc.) with ethyl 2-cyano-3-ethylthio-2-butenoate (2 gms.; .01 mol.) and triethylamine (3 cc.; .02 mol.). The mixture was boiled gently under reflux for 10 minutes giving a deep magenta/red solution. On dilution and cooling mauve crystals separated. M. Pt. 150° C. The crystals were extracted with benzene in a Soxhlett extractor and after concentrating the benzene solution under reduced pressure the product was precipitated with light petroleum. M. Pt. 173° C. Crystallisation from methyl alcohol gave blue tinted crystals. M. Pt. 175° C.

This dyestuff, incorporated in a gelatino silver iodobromide emulsion, imparts a band of sensitivity extending to 650 mµ with a peak maximum at 620 mµ.

EXAMPLE 9

*Ethyl 6-(1-ethyl-1:2-dihydro quinolylidene-2-)3-ethylthio-2-cyano-2:4-hexadienoate*

Quinaldine ethiodide (3 gms.; .01 mol.) was boiled gently under reflux in acetic anhydride (40 cc.) with triethyl trithio ortho formate (2 cc.; .012 mol.) for 20 minutes. The acetic anhydride was removed by distillation in vacuo. The residual oil was washed with dry ether and dissolved in ethyl alcohol (40 cc.). Ethyl 2-cyano-3-ethylthio-2-butenoate (2 gms.; .01 mol.) and triethylamine (1.5 cc.; .01 mol.) were added and the solution boiled gently under reflux for 10 minutes. Dilution with water of the deep blue solution precipitated an oil which was extracted with benzene. The benzene solution was washed with water, dried over potassium carbonate and concentrated in vacuo to about 10 cc. Addition of light petroleum precipitated green crystals. M. Pt. 145° C. Crystallisation from methyl alcohol gave M. Pt. 146° C.

This dyestuff, incorporated in a gelatino silver iodobromide emulsion, imparts a band of sensitivity extending to 760 mµ with a maximum at 730 mµ.

EXAMPLE 10

*Ethyl 6-(1:3:3-trimethyl-1:2-dihydro indolylidene-2-)3-ethylthio-2-cyano-2:4-hexadienoate*

ω-Ethyl thio vinyl trimethyl indolenine methiodide (1.7 gms.; .005 mol.) was dissolved in ethyl alcohol (20 cc.) with ethyl 2-cyano-3-ethylthio-2-butenoate (0.5 gm.; .005 mol.) and triethylamine (1.5 cc.; .01 mol.) The mixture was boiled gently under reflux for 10 minutes giving a mauve/pink solution. Dilution with water precipitated an oil which hardened rapidly to give blue tinted crystals, M. Pt. 117° C. The product was extracted with benzene in a Soxhlett extractor and the benzene concentrated under reduced pressure to about 5 cc. The remaining benzene was allowed to evaporate to dryness and the residue was dissolved in ethyl alcohol. On standing mauve crystals separated. M. Pt. 117° C. Recrystallisation from methyl alcohol did not raise the melting point.

This dyestuff, incorporated in a gelatino silver iodobromide emulsion, imparts a band of sensitivity extending to 630 mµ with a flat maximum at about 580 mµ.

EXAMPLE 11

*Ethyl 6-(3-methyl-2:3-dihydro-6:7-benzbenzthiazolylidene-2-)-3-ethylthio-2-cyano-2:4-hexadienoate*

2 methyl α naphthathiazole (1.005 gms.; .005 mol.) was fused with methyl para toluene sulphonate (.93 gm.; 005 mol.) at 100° C. for 6 hours. Acetic anhydride (20 cc.) and triethyl trithio ortho formate (1 cc.; 0052 mol.) were then added and the mixture boiled gently under reflux for 20 minutes. The acetic anhydride was distilled off in vacuo. The residual oil was washed with dry ether and dissolved in ethyl alcohol (20 cc.). Ethyl 2-cyano-3-ethylthio-2-butenoate (1 gm.;

.005 mol.) and triethylamine (.75 cc.; 005 mol.) were added and the mixture boiled gently under reflux for 10 minutes giving a deep mauve/blue solution. On cooling and dilution with water green tinted crystals separated. M. Pt. 192° C. The product was extracted with benzene in a Soxhlett extractor and the benzene solution concentrated to about 10 cc. in vacuo. Dilution with light petroleum precipitated crystals M. Pt. 192° C. Crystallisation from ethyl alcohol gave no increase in melting point.

This dyestuff, incorporated in a gelatino silver iodobromide emulsion, imparts a band of sensitivity extending to 690 m$\mu$ with a flat maximum at about 640 m$\mu$.

EXAMPLE 12

*Ethyl 6-(3-methyl-2:3-dihydro-4:5 - benz - benzthiazolylidene-2-)-3-ethylthio-2 - cyano - 2:4-hexadienoate*

2 methyl $\beta$ naphthathiazole (1.005 gms.; .005 mol.) was fused with methyl para toluene sulphonate (.93 gm.; .005 mol.) at 100° C. for 16 hours. Acetic anhydride (20 cc.) and triethyl trithio ortho formate (1 cc.; .0052 mol.) were then added and the mixture boiled gently under reflux for 20 minutes. The acetic anhydride was distilled off in vacuo. The residual oil was washed with dry ether and dissolved in ethyl alcohol (30 cc.). Ethyl 2-cyano-3-ethylthio-2-butenoate (1 gm.; .005 mol.) and triethylamine (.75 cc.; .005 mol.) were added and the mixture boiled gently under reflux for 10 minutes giving a deep mauve/blue solution. On cooling and dilution with water green tinted crystals separated, M. Pt. 186° C. The product was extracted with benzene in a Soxhlett extractor and the benzene solution concentrated to about 10 cc. in vacuo. Dilution with light petroleum ether precipitated crystals, M. Pt. 199° C. Crystallisation from methyl alcohol gave M. Pt. 202° C.

This dyestuff, incorporated in a gelatino silver iodobromide emulsion, imparts a band of sensitivity extending to 740 m$\mu$ with a sharp maximum at 690 m$\mu$.

EXAMPLE 13

*Ethyl 6-(3-ethyl-2:-dihydro-5-phenyl benzoxazolylidene-2-)-3-ethylthio-2-cyano-2:4-hexadienoate*

2-methyl 5-phenyl benzoxazole (2.09 gms.; .01 mol.) was fused with ethyl para toluene sulphonate (1.99 gms.; .01 mol.) for 16 hours at 100° C. Triethyl trithioortho formate (2 cc.; .012 mol.) was added and the mixture boiled gently under reflux in acetic anhydride (20 cc.) for 20 minutes. The acetic anhydride was distilled off in vacuo. The residual oil was washed with dry ether and dissolved in ethyl alcohol (20 cc.) with ethyl 2-cyano-3-ethylthio-2-butenoate (2 gms.; .01 mol.) and triethylamine (1.5 cc.; .01 mol.). The mixture was boiled gently under reflux for 10 minutes giving a deep magenta/red solution. On dilution and cooling mauve crystals separated, M. Pt. 162° C. The crystals were extracted with benzene in a Soxhlett extractor and the benzene solution concentrated to about 10 cc. in vacuo. Dilution with light petroleum ether precipitated crystals, M. Pt. 163° C. Crystallisation from methyl alcohol gave blue tinted crystals, M. Pt. 164° C.

This dyestuff, incorporated in a gelatino silver iodobromide emulsion, imparts a band of sensitivity extending to 620 m$\mu$ with a flat maximum at about 580 m$\mu$.

EXAMPLE 14

*Ethyl 6-(3-ethyl-2:3-dihydro - 6:7 - benzbenzthiazolylidene-2-)-3-ethylthio - 2-cyano-2:4-hexadienoate*

2 methyl $\alpha$ naphthathiazole (1.005 gms.; .005 mol.) was fused with ethyl para toluene sulphonate (.99 gm.; .005 mol.) at 160° C. for 8 hours. Acetic anhydride (30 cc.) and triethyl trithio ortho formate (1 cc.; .0052 mol.) were then added and the mixture boiled gently under reflux for 30 minutes. The acetic anhydride was distilled off in vacuo. The residual oil was washed in dry ether and dissolved in ethyl alcohol (25 cc.). Ethyl 2-cyano-3-ethyl-thio-2-butenoate (1 gm.; .005 mol.) and triethylamine (.75 cc.; .005 mol.) were added and the mixture boiled gently under reflux for 10 minutes giving a deep mauve/blue solution. On standing and dilution green tinted crystals separated. M. Pt. 170° C. The product was extracted with benzene in a Soxhlett extractor and the benzene solution concentrated to about 10 cc. in vacuo. Dilution with light petroleum ether precipitated crystals M. Pt. 176° C. Crystallisation from ethyl alcohol gave M. Pt. 177° C.

This dyestuff, incorporated in a gelatino silver iodobromide emulsion, imparts a band of sensitivity extending to 670 m$\mu$ with a flat maximum at about 650 m$\mu$.

EXAMPLE 15

*Ethyl 6 - (3 - methyl-2:3 - dihydrobenzthiazolylidene-2-)-3-methylthio-2-cyano - 2:4 - hexadienoate*

Methyl benzthiazole (.745 gm.; .005 mol.) was fused with methyl para toluene sulphonate (.93 gm.; .005 mol.) for 16 hours at 100° C. Triethyl trithio ortho formate (1 cc.; .0052 mol.) was then added and the mixture boiled gently under reflux for 20 minutes in acetic anhydride (15 cc.). The acetic anhydride was then removed by distillation in vacuo. The residual oil was washed with dry ether and dissolved in ethyl alcohol (20 cc.) with ethyl 2-cyano-3-methylthio-2-butenoate (.925 gm.; .005 mol.) Triethylamine (.75 cc.; .005 mol.) was then added and the mixture was boiled gently under reflux for 10 minutes giving a deep mauve/blue solution, On dilution and cooling blue tinted crystals separated. M. Pt. 167° C. The crystals were extracted with benzene in a Soxhlett extractor and the benzene solution concentrated in vacuo to about 10 cc . Dilution with light petroleum ether precipitated dark blue crystals. M. Pt. 169° C. Crystallisation from methyl alcohol gave M. Pt. 171° C.

This dyestuff, incorporated in a gelatino silver iodobromide emulsion, imparts a band of sensitivity extending to 730 m$\mu$ with a maximum at 690 m$\mu$.

EXAMPLE 16

*Ethyl 6(3-methyl-2:3-dihydrobenzthiazolylidene-2-2)-3-methylthio-2-cyano-2:4-hexadienoate*

2-methyl benzthiazole (.745 gm.; .005 mol.) was fused with ethyl para toluene sulphonate (.995 gm.; .005 mol.) for 16 hours at 100° C. Acetic anhydride (20 cc.) and triethyl trithio ortho formate (1 cc.; .0052 mol.) were then added and the mixture boiled gently under reflux for 20 minutes. Acetic anhydride was distilled off in vacuo and the remaining oil washed with dry ether and dissolved in ethyl alcohol (20 cc.). Ethyl-2-cyano-3-methylthio - 2 - butenoate (.925 gm.; .005 mol.) and triethylamine (.75 cc.; .005 mol.) were then added and the mixture boiled gently under reflux for 10 minutes giving a mauve/blue solution. On cooling and dilution blue tinted crystals separated. M. Pt. 139° C. The crystals were extracted with benzene in a Soxhlett extractor and the benzene concentrated in vacuo to about 15 cc. Dilution with light petroleum ether precipitated crystals, M. Pt. 144° C. Crystallisation from methyl alcohol gave M. Pt. 146° C.

This dyestuff, incorporated in a gelatino silver iodobromide emulsion, imparts a band of sensitivity extending to 660 m$\mu$ with a maximum at about 620 m$\mu$.

EXAMPLE 17

*Ethyl 6 - (3-methyl-2:3-dihydro-4:5-benz-benzthiazolylidene - 2 - ) - 3 - methylthio-2-cyano-2:4-hexadienoate*

2 methyl $\beta$ naphthathiazole (1.005 gms.; .005 mol.) was fused with methyl para toluene sulphonate (.93 gm.; .005 mol.) at 140° C. for 6 hours. Acetic anhydride (20 cc.) and triethyl trithio ortho formate (1 cc.; .0052 mol.) were added and the mixture boiled gently under reflux for 20 minutes. The acetic anhydride was distilled off in vacuo and the remaining oil washed with dry ether and dissolved in ethyl alcohol (20 cc.). Ethyl-2-cyano-3-methylthio - 2 - butenoate (.925 gm.; .005 mol.) and triethylamine (.75 cc.; .005 mol.) were then added and the mixture boiled gently under reflux for 10 minutes giving a deep mauve/blue solution. On cooling and dilution crystals separated, M. Pt. 197° C. The crystals were extracted with benzene in a Soxhlett extractor and the benzene solution concentrated in vacuo to about 15 cc. Dilution with light petroleum ether precipitated crystals M. Pt. 229° C. Crystallisation from methyl alcohol gave M. Pt. 230° C.

This dyestuff, incorporated in a gelatino silver iodobromide emulsion, imparts a band of sensitivity extending to about 700 m$\mu$ with a maximum at about 650 m$\mu$.

EXAMPLE 18

*Ethyl 6-(3-methyl-2:3-dihydro-5-phenyl - benzoxazolylidene-2-)-3-methylthio-2-cyano - 2:4-hexadienoate*

2-methyl-5-phenyl-benzoxazole (1.04 gms.; .005 mol.) was fused with methyl para toluene sulphonate (.93 gm.; .005 mol.) at 100° C. for 2 hours. Acetic anhydride (20 cc.) and triethyl trithio ortho formate (1 cc.; .0052 mol.) were added and the mixture boiled gently under reflux for 20 minutes. The acetic anhydride was distilled off in vacuo and the remaining oil washed with dry ether and dissolved in ethyl alcohol (20 cc.). Ethyl-2-cyano-3-methylthio-2-butenoate (.925 gm.; .005 mol.) and triethylamine (.75 cc.; .005 mol.) were then added and the mixture boiled gently under reflux for 10 minutes giving a mauve/pink solution. On cooling and dilution blue tinted crystals separated. M. Pt. 182° C. The crystals were extracted with benzene in a Soxhlett extractor and the benzene solution was concentrated in vacuo to about 15 cc. Dilution with light petroleum ether precipitated crystals M. Pt. 199° C. Crystallisation from methyl alcohol gave M. Pt. 204° C. Recrystallisation from methyl alcohol gave M. Pt. 206° C.

This dyestuff, incorporated in a gelatino silver iodobromide emulsion, imparts a sensitivity extending to about 690 m$\mu$ with a maximum at about 670 m$\mu$.

EXAMPLE 19

*Ethyl 6-(3-ethyl-2:3-dihydro-5:6-dioxymethylene-benzthiazolylidene-2-)-3-methylthio-2-cyano-2:4-hexadienoate*

2-methyl dioxymethylene benzthiazole (.975 gm.; .005 mol.) was fused with methyl para toluene sulphonate (.93 gm.; .005 mol.) for 4 hours at 120° C. Acetic anhydride (20 cc.) and triethyl trithio ortho formate (1 cc.; .0052 mol.) were then added and the mixture boiled gently under reflux for 20 minutes. The acetic anhydride was distilled off in vacuo and the remaining oil washed with dry ether and dissolved in ethyl alcohol (20 cc.). Ethyl-2-cyano-3-methylthio-2-butenoate (.925 gm.; .005 mol.) and triethylamine (.75 cc.; .005 mol.) were then added and the mixture boiled gently under reflux for 10 minutes giving a mauve/blue solution. On cooling and dilution blue tinted crystals separated. M. Pt. 246° C. The crystals were extracted with benzene in a Soxhlett extractor and the benzene solution concentrated in vacuo to about 15 cc. Dilution with light petroleum ether precipitated crystals M. Pt. 253° C. Crystallisation from ethyl alcohol did not raise the melting point.

EXAMPLE 20

*Ethyl 6 - (3 - methyl - 2:3-dihydro-5:6-dimethyl benzoxazolylidene - 2-)-3-methylthio-2-cyano-2:4-hexadienoate*

2:5:6 trimethyl benzoxazole (.81 gm.; .005 mol.) was fused with methyl para toluene sulphonate (.93 gm.; .005 mol.) at 120° C. for 4 hours. Triethyl trithio ortho formate (1 cc.; .0052 mol.) was then added and the mixture boiled gently under reflux for 20 minutes in acetic anhydride (10 cc.). The acetic anhydride was distilled off in vacuo and the remaining oil washed with dry ether and dissolved in ethyl alcohol (10 cc.). Ethyl-2-cyano-3-methylthio-2-butenoate (.925 gm.; .005 mol.) and triethylamine (.75 cc.; .005 mol.) were then added and the mixture boiled gently under reflux for 10 minutes giving a mauve/pink solution. On cooling and dilution crystals separated. M. Pt. 146° C. The crystals were extracted with benzene in a Soxhlett extractor and the benzene solution was concentrated to about 10 cc. under reduced pressure. Dilution with light petroleum ether precipitated crystals M. Pt. 155° C. Crystallisation from methyl alcohol gave M. Pt. 157° C.

EXAMPLE 21

*Ethyl 6-(1-methyl - 1:2 - dihydro-quinolylidene-4-)-3-methylthio-2-cyano-2:4-hexadienoate*

Lepidine (1.43 gms.; .01 mol.) was fused with methyl para toluene sulphonate (1.86 gms.; .01 mol.) for 8 hours at 120° C. Acetic anhydride (20 cc.) and triethyltrithio ortho formate (2 cc.; .012 mol.) were added and the mixture boiled gently under reflux for 20 minutes. The acetic anhydride was distilled off in vacuo and the remaining oil washed with dry ether and dissolved in ethyl alcohol (20 cc.). Ethyl-2-cyano-3-methylthio-2-butenoate (1.85 gms.; .01 mol.) and triethylamine (1.5 cc.; .01 mol.) were then added and the mixture boiled gently under reflux for 10 minutes giving a deep blue solution. On cooling and dilution an oil separated. The oil was extracted with benzene and the benzene solution concentrated in vacuo to about 15 cc. Dilution with light petroleum ether precipitated crystals M. Pt. 152° C. Crystallisation from methyl alcohol gave M. Pt. 154° C.

EXAMPLE 22

*Ethyl-6-(3-methyl - 2:3 - dihydrobenzthiazoylidene-2-)-3-n.butyl-thio - 2 - cyano-2:4 - hexadienoate*

Methyl benzthiazole (.298 gms.; .002 mol.) was fused with methyl para toluene sulphonate (.364 gms.; .002 mol.) at 100° C. for 4 hours. Triethyl trithio ortho formate (.4 cc.; .0021 mol.) and acetic anhydride (10 cc.) were added and the mixture boiled gently under reflux for 10 minutes. The acetic anhydride was distilled off in vacuo and the residual oil washed with dry ether and dissolved in ethyl alcohol (10 cc.). Ethyl-2-cyano-3-n.butylthio-2-butenoate (.545 gms.; .002 mol.) and triethylamine (.3 cc.; .002 mol.) were added and the mixture boiled gently under reflux for 10 minutes giving a mauve/blue solution. On cooling and dilution blue tinted crystals separated. M. Pt. 140° C. The crystals were extracted with benzene in a Soxhlett extractor and the benzene solution concentrated to about 15 cc. under reduced pressure. Dilution with light petroleum ether precipitated crystals M. Pt. 146° C. Crystallisation from methyl alcohol gave M. Pt. 147° C.

EXAMPLE 23

*Ethyl-6-(3-methyl - 2:3 - dihydrobenzthiazoylidene-2-)-3-isopropyl-thio - 2 - cyano-2:4-butenoate*

Methyl benzthiazole (.298 gm.; .002 mol.) was fused with methyl para toluene sulphonate (.364 gm.; .002 mol.) at 100° C. for 4 hours. Triethyl trithio ortho formate (.4 cc.; .0021 mol.) and acetic anhydride (10 cc.) were added and the mixture boiled gently under reflux for 10 minutes. The acetic acid was distilled off in vacuo and the residual oil washed with dry ether and dissolved in ethyl alcohol (10 cc.). Ethyl-2-cyano-3-isopropylthio-2-butenoate (.426 gm.; .002 mol.) and triethylamine (.3 cc.; .002 mol.) were then added and the mixture boiled gently under reflux for 10 minutes giving a mauve/blue solution. On cooling and dilution blue tinted crystals separated. M. Pt. 144° C. The crystals were extracted with benzene in a Soxhlett extractor and the benzene solution concentrated to about 15 cc. under reduced pressure. Dilution with light petroleum ether precipitated crystals M. Pt. 148° C. Crystallisation from methyl alcohol gave M. Pt. 149° C.

EXAMPLE 24

*Ethyl-6-(3-methyl - 2:3 - dihydrobenzthiazoylidene-2-)-3-benzylthio - 2 - cyano- 2:4 -hexadienoate*

Methyl benzthiazole (.298 gm.; .002 mol.) was fused with methyl para toluene sulphonate (.364 gm.; .002 mol.) for 4 hours at 100° C. Triethyl trithio ortho formate (.4 cc.; .0021 mol.) and acetic anhydride (10 cc.) were added and the mixture boiled gently under reflux for 10 minutes. The acetic anhydride was distilled off in vacuo and the residual oil washed with dry ether and dissolved in ethyl alcohol (10 cc.) Ethyl-2-cyano-3-benzylthio-2-butenoate (.524 gm.; .002 mol.) and triethylamine (.3 cc.; .002 mol.) were then added and the mixture boiled gently under reflux for 10 minutes giving a mauve/blue solution. On cooling and dilution blue tinted crystals separated. M. Pt. 154° C. The crystals were extracted with ether in a Soxhlett extractor. On cooling the ether solution crystals separated. M. Pt. 160° C. Crystallisation from methyl alcohol gave M. Pt. 161° C.

EXAMPLE 25

*Methyl-6-(3-methyl - 2:3 - dihydrobenzthiazoylidene-2-) - 3-ethylthio-2-cyano -2:4- hexadienoate*

Methyl benzthiazole (.745 gm.; .005 mol.) was fused with methyl para toluene sulphonate (.93 gm.; .005 mol.) at 100° C. for 4 hours. Triethyl trithio ortho formate (1 cc.; .0052 mol.) was added and the mixture boiled gently under reflux for 10 minutes in acetic anhydride (20 cc.) The acetic anhydride was distilled off in vacuo and the residual oil washed with dry ether and dissolved in ethyl alcohol (20 cc.). Methyl-2-cyano-3-ethylthio-2-butenoate (.925 gm.; .005 mol.) and triethylamine (.75 cc.; .005 mol.) were added and the mixture boiled gently under reflux for 10 minutes giving a mauve/blue solution. On cooling and dilution blue tinted crystals separated. M. Pt. 193° C. The crystals were extracted with benzene in a Soxhlett extractor and the benzene solution concentrated under reduced pressure to about 15 cc. Dilution with light petroleum ether precipitated crystals M. Pt. 198° C. Crystallisation from ethyl alcohol gave M. Pt. 199° C.

EXAMPLE 26

*Methyl-6-(3-methyl - 2:3 - dihydrobenzthiazoylidene-2-)-3-methylthio - 2 - cyano- 2:4 -hexadienoate*

Methyl benzthiazole (.745 gm.; .005 mol.) was fused with methyl para toluene sulphonate (.93 gm.; .005 mol.) for 4 hours at 100° C. Triethyl trithio ortho formate (1 cc.; .0052 mol.) was added and the mixture boiled gently under reflux for 20 minutes in acetic anhydride (20 cc.). The acetic anhydride was distilled off in vacuo and the residual oil washed with dry ether and dissolved in ethyl alcohol (20 cc.) Methyl-2-cyano-3-methylthio-2-butenoate (.855 gm.; .005 mol.) and triethylamine (.3 cc.; .005 mol.) were then added and the mixture boiled gently under reflux for 10 minutes. On cooling and dilution blue tinted crystals separated. M. Pt. 196° C. The crystals were extracted with benzene in a Soxhlett extractor and the benzene solution concentrated under reduced pressure to about 15 cc. Dilution with light petroleum ether precipitated crystals M. Pt. 196° C. Crystallisation from methyl alcohol gave M. Pt. 197° C.

EXAMPLE 27

*Methyl-6-(3 - methyl-2:3-dihydrobenzoxazolylidene-2-)-3-ethylthio-2-cyano- 2:4 -hexadienoate*

Methyl benzoxazole (.665 gm.; .005 mol.) was fused with methyl para toluene sulphonate (.93 gm.; .005 mol.) at 100° C. for 4 hours. Ethyl trithio ortho formate (1 cc.; .005 mol.) was added and the mixture boiled gently under reflux for 20 minutes in acetic anhydride (20 cc.). The acetic anhydride was distilled off in vacuo and the residual oil washed with dry ether and dissolved in ethyl alcohol (10 cc.). Methyl-2-cyano-3-ethylthio-2-butenoate (.925 gm.; .005 mol.) and triethylamine (.75 cc.; .005 mol.) were added and the mixture boiled gently under reflux for 10 minutes giving a mauve/pink solution. On cooling and dilution blue tinted crystals separated. M. Pt. 167° C. The crystals were extracted with ether in a Soxhlett extractor and the ether solution concentrated to about 20 cc. when crystals separated. M. Pt. 171° C. Crystallisation from methyl alcohol gave M. Pt. 172° C.

Analogous compounds may be made by strictly similar processes starting with 2-methyl selenazoline or 2-methyl oxazoline, with 2-methyl benzselenazole or with 2-methyl pyrimidine or 2-methyl quinazoline. In each case the quaternary salt may be an alkyl, e. g. methyl, ethyl or higher alkyl or benzyl iodide, chloride, bromide, hydrogen sulphate or p-toluene sulphonate.

What I claim is:

1. Process for the production of methine dyestuffs which comprises reacting a compound of the general formula:

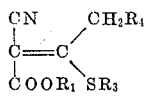

where $R_1$ is an alkyl group, $R_3$ is selected from the class consisting of alkyl and aralkyl groups and $R_4$ is selected from the class consisting of the hydrogen atom and alkyl groups, with a compound of the general formula:

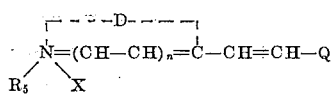

where Q is selected from the class consisting of the thioether group $SR_6$ where $R_6$ is an alkyl group and amino and acetamino groups, $R_5$ is selected from the class consisting of alkyl and aralkyl groups, X is an acid radicle, $n$ is selected from nought and one and D is the residue of a heterocyclic nitrogen nucleus of the type used in cyanine dyes.

2. Process for the production of methine dyestuffs which comprises reacting a compound of the general formula:

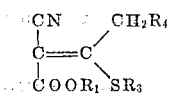

where $R_1$ is an alkyl group, $R_3$ is selected from the class consisting of alkyl and aralkyl groups and $R_4$ is selected from the class consisting of the hydrogen atom and alkyl groups, with a compound of the general formula:

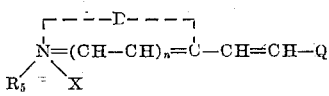

where Q is selected from the class consisting of the thioether group $SR_6$ where $R_6$ is an alkyl group and amino and acetamino groups, $R_5$ is selected from the class consisting of alkyl and aralkyl groups, X is an acid radicle, $n$ is selected from nought and one and D is the residue of a heterocyclic nitrogen nucleus of the type used in cyanine dyes, the reaction being effected by heating the reagents together in the presence of a basic condensing agent.

3. A dyestuff of the general formula:

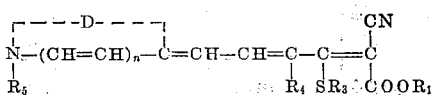

where $R_3$ and $R_5$ are selected from the class consisting of alkyl and aralkyl groups, $R_1$ is an alkyl group, $R_4$ is selected from the class consisting of the hydrogen atom and alkyl groups, $n$ is selected from nought and one and D is the residue of a heterocyclic nitrogen nucleus of the type used in cyanine dyes.

4. Process for the production of methine dyestuffs of the general formula:

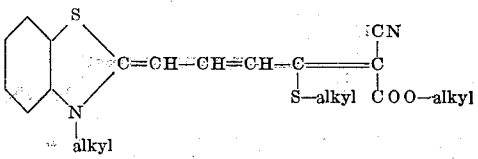

which comprises reacting an alkyl 2-cyano-3-alkylthio-2-butenoate with a 2-thioether vinyl benzthiazole quaternary salt alkyl by heating the reagents together in the presence of a basic condensing agent.

5. Process for the production of methine dyestuffs of the general formula:

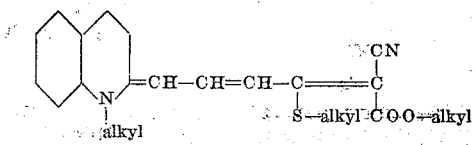

which comprises reacting an alkyl 2-cyano-3-alkylthio-2-butenoate with a 2-thioether vinyl quinoline quaternary salt alkyl by heating the reagents together in the presence of a basic condensing agent.

6. Process for the production of methine dyestuffs of the general formula:

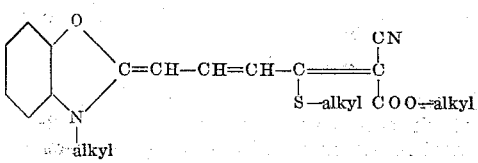

which comprises reacting an alkyl 2-cyano-3-alkylthio-2-butenoate with a 2-thioether vinyl benzoxazole quaternary salt alkyl by heating the reagents together in the presence of a basic condensing agent.

7. Process for the production of methine dyestuffs of the general formula:

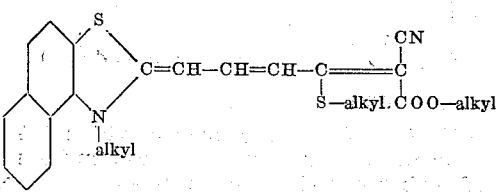

which comprises reacting an alkyl 2-cyano-3-alkylthio-2-butenoate with a 2-thioether vinyl naphthathiazole quaternary salt alkyl by heating the reagents together in the presence of a basic condensing agent.

8. Process for the production of methine dyestuffs of the general formula:

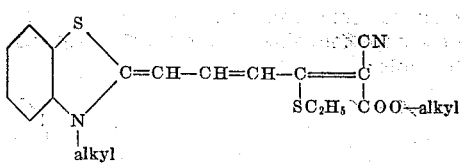

which comprises reacting an alkyl 2-cyano-3-ethylthio-2-butenoate with a 2-thioether vinyl benzthiazole quaternary salt alkyl by heating the reagents together in the presence of a basic condensing agent.

9. Process for the production of methine dyestuffs of the general formula:

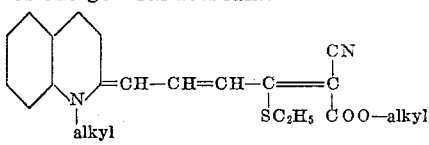

which comprises reacting an alkyl 2-cyano-3-ethylthio-2-butenoate with a 2-thioether vinyl quinoline quaternary salt alkyl by heating the reagents together in the presence of a basic condensing agent.

10. Process for the production of methine dyestuffs of the general formula:

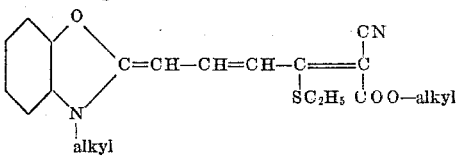

which comprises reacting an alkyl 2-cyano-3-ethylthio-2-butenoate with a 2-thioether vinyl benzoxazole quaternary salt alkyl by heating the reagents together in the presence of a basic condensing agent.

11. Process for the production of methine dyestuffs of the general formula:

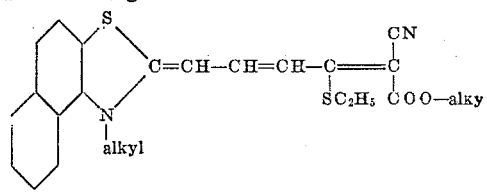

which comprises reacting an alkyl 2-cyano-3-ethylthio-2-butenoate with a 2-thioether vinyl naphthathiozole quaternary salt alkyl by heating the reagents together in the presence of a basic condensing agent.

12. An alkyl 2-cyano-3-alkylthio-2:4-hexadienoate containing in the 6-position the residue of a benzthiazole nucleus having the general formula:

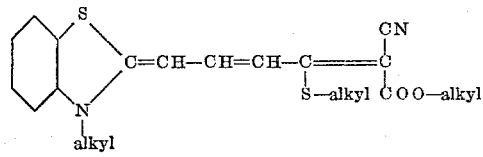

13. An alkyl 2-cyano-3-alkylthio-2:4-hexadienoate containing in the 6-position the residue of a benzoxazole nucleus having the general formula:

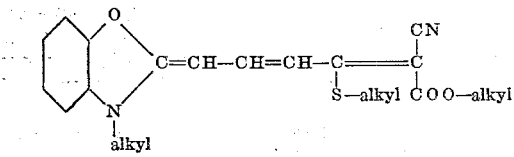

14. An alkyl 2-cyano-3-alkylthio-2:4-hexadienoate containing in the 6-position the residue of a naphthathiazole nucleus having the general formula:

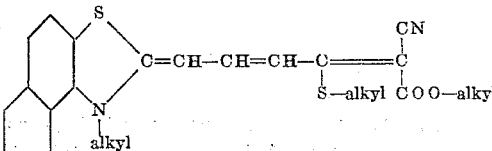

15. An alkyl 2-cyano-3-alkylthio-2:4-hexadienoate containing in the 6-position the residue of a quinoline nucleus having the general formula:

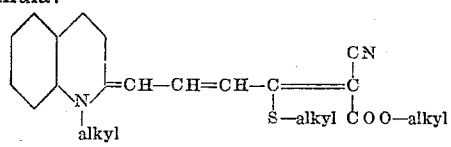

16. Ethyl 6-(3-methyl-2:3-dihydro-5-phenyl benzoxazolylidene-2-)-3-ethylthio-2-cyano-2:4-hexadienoate having the formula:

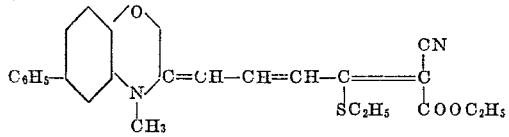

17. Ethyl 6-(1-ethyl-1:2-dihydro quinolylidene-2-)3-ethylthio-2-cyano-2:4-hexadienoate having the formula:

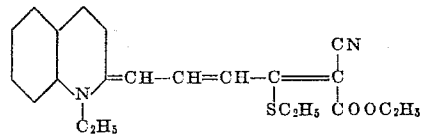

18. Ethyl 6-(3-methyl-2:3-dihydro-4:5-benzbenzthiazolylidene-2-)-3-ethylthio-2-cyano-2:4-hexadienoate having the formula:

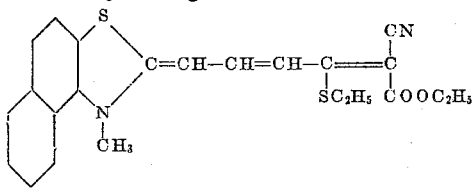

19. Methyl 6-(3-methyl-2:3-dihydrobenzthiazolylidene-2-)-3-ethylthio-2-cyano-2:4-hexadienoate having the formula:

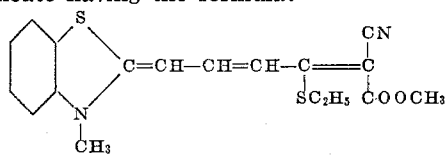

20. Methyl-6-(3-methyl-2:3-dihydrobenzoxazolylidene-2-)-3-ethylthio-2-cyano-2:4-hexadienoate having the formula:

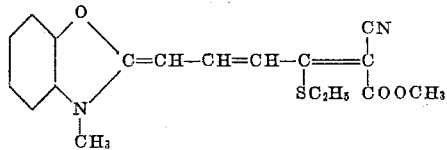

HARRY DEREK EDWARDS.

REFERENCES CITED

The following references are of record in the file of this patent:

UNITED STATES PATENTS

| Number | Name | Date |
| --- | --- | --- |
| 2,166,736 | White et al. | July 18, 1939 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,511,210 | Kendall et al. | Jan. 13, 1950 |

OTHER REFERENCES

Chemical Abstracts 16:3101 (Abstract of Brit. Med. Journal, 1922 I 514–515).

Chemical Abstracts 19:530 (Abstract of Proc. Roy. Soc., London, 96B, 317–333, 1924).